United States Patent
Kim et al.

(10) Patent No.: US 9,055,060 B2
(45) Date of Patent: Jun. 9, 2015

(54) CLOUD SERVICE SYSTEM BASED ON ENHANCED SECURITY FUNCTION AND METHOD FOR SUPPORTING THE SAME

(75) Inventors: Do Wan Kim, Seongnam-si (KR); Hyun Wook Kim, Seongnam-si (KR); Jung Keum Shin, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 69 days.

(21) Appl. No.: 13/991,054

(22) PCT Filed: Sep. 5, 2012

(86) PCT No.: PCT/KR2012/007134
§ 371 (c)(1),
(2), (4) Date: May 31, 2013

(87) PCT Pub. No.: WO2013/183814
PCT Pub. Date: Dec. 12, 2013

(65) Prior Publication Data
US 2013/0333005 A1  Dec. 12, 2013

(30) Foreign Application Priority Data
Jun. 7, 2012  (KR) .................. 10-2012-0061099

(51) Int. Cl.
*G06F 7/04*  (2006.01)
*H04L 29/06*  (2006.01)

(52) U.S. Cl.
CPC .............. *H04L 63/083* (2013.01); *H04L 63/08* (2013.01); *H04L 63/105* (2013.01)

(58) Field of Classification Search
CPC ...... H04L 63/08; H04L 63/083; H04L 63/105
USPC .......................................... 726/2, 5; 713/168
See application file for complete search history.

(56) References Cited

U.S. PATENT DOCUMENTS

| | | | |
|---|---|---|---|
| 8,601,265 B2* | 12/2013 | Mane et al. .................. | 713/168 |
| 2007/0168677 A1* | 7/2007 | Kudo et al. .................. | 713/185 |

(Continued)

FOREIGN PATENT DOCUMENTS

| | | |
|---|---|---|
| JP | 2003167854 A | 6/2003 |
| JP | 2006092533 A | 4/2006 |

(Continued)

OTHER PUBLICATIONS

Ramya Devi M. et al. "The Trusted Computing exemplary with Astonishing Security for Cloud Computing", IJCSNS International Journal of Computer Science and Network Security, Jan. 2011, p. 206-209, vol. 11 No. 1.

(Continued)

*Primary Examiner* — Samson Lemma
(74) *Attorney, Agent, or Firm* — Lowe Hauptman & Ham, LLP (57) ABSTRACT

The present invention relates to cloud service supporting technology. Particularly, a cloud service system based on an enhanced security function includes a terminal that includes a trusted platform therein and is configured to perform security authentication based on encrypted information provided by the trusted platform, to perform normal authentication based on preregistered ID and password information, and to use a cloud service according to the security authentication and the normal authentication, and a cloud service apparatus that is configured to provide the cloud service to the terminal after completing the security authentication and the normal authentication with the terminal that includes the trusted platform therein. The service apparatus, the terminal, and a method for supporting them are also disclosed.

13 Claims, 7 Drawing Sheets

(56) References Cited

U.S. PATENT DOCUMENTS

2012/0030475 A1* 2/2012 Ma et al. .................. 713/186
2012/0266252 A1* 10/2012 Spiers et al. ................ 726/26

FOREIGN PATENT DOCUMENTS

| JP | 2008541264 A | 11/2008 |
| JP | 2009043042 A | 2/2009 |
| JP | 2012008951 A | 1/2012 |
| KR | 1020070068255 A | 6/2007 |
| KR | 1020090066060 A | 6/2009 |
| KR | 1020110041233 A | 4/2011 |
| KR | 1020110051028 A | 5/2011 |

OTHER PUBLICATIONS

International Search Report for application No. PCT/KR2012/007134 dated Jan. 30, 2013.
Japanese Office Action for application No. 2014-520147 dated Oct. 21, 2014.

* cited by examiner

CLOUD SERVICE SYSTEM BASED ON ENHANCED SECURITY FUNCTION AND METHOD FOR SUPPORTING THE SAME

TECHNICAL FIELD

The present invention relates to cloud service supporting technology and, more particularly, to a system and method for allowing a safe and convenient use of a cloud service on the basis of an enhanced security function.

BACKGROUND ART

Communication terminals manufactured in a portable form have been used in a great variety of fields due to their convenience in use and good portability. Recently such communication terminals have developed in the form of smart phone having various user functions, thus offering much convenience and great entertainment.

Meanwhile, users who have several terminals as well as a smart phone have had interest in sharing data stored in respective terminals. Additionally, the popularization of smart phones today gives rise to a growing interest in sharing data among users. For these reasons, a cloud service begins to again grab the attention of the market.

A conventional cloud service performs an authentication process on the basis of ID and password which have been registered in advance for access from terminals. However, ID and password may be easily spilled, and thus worry about security of a cloud service is increasing. Particularly, since a cloud service tends to be used for saving personal information, the issue of information spill becomes more serious. Therefore, more enhanced technique that has ability to reliably support a data sharing of users without worry about information spill is required.

DETAILED DESCRIPTION OF THE INVENTION

Technical Problems

Accordingly, one aspect of the present invention is to provide an enhanced security based cloud service system for supporting the use of a cloud service by users only authenticated on the basis of a security function, and a method for supporting the system.

Another aspect of the present invention is to provide an enhanced security based cloud service system for supporting the use of a cloud service in various forms by differentially performing information security process according to authentication grades.

Technical Solutions

One aspect of the present invention provides a cloud service system based on an enhanced security function. The system includes a terminal including a trusted platform therein and configured to perform security authentication based on encrypted information provided by the trusted platform, to perform normal authentication based on preregistered ID and password information, and to use a cloud service according to the security authentication and the normal authentication; and a cloud service apparatus configured to provide the cloud service to the terminal after completing the security authentication and the normal authentication with the terminal that includes the trusted platform therein.

Another aspect of the present invention provides a cloud service apparatus based on an enhanced security function. The apparatus includes an apparatus communication unit configured to establish a communication channel for access from a terminal including a trusted platform therein; an apparatus control unit configured to perform at least one of security authentication and normal authentication, the security authentication being based on encrypted information provided by the trusted platform, the normal authentication being based on preregistered ID and password information, and to support a cloud service according to the security authentication and the normal authentication; and an apparatus storage unit configured to store database for supporting the cloud service.

The apparatus storage unit may be further configured to store a security database configured to realize a security area that is accessible according to the security authentication; a normal database configured to realize a normal area that is accessible according to the normal authentication; and authentication information used for authenticating the terminal that requests the access.

The apparatus control unit may be further configured to allocate authority to access the normal area to the terminal that performs the normal authentication; to allocate authority to access the security area or authority to access both the security area and the normal area to the terminal that performs the security authentication; or to allocate authority to access the security area or authority to access both the security area and the normal area to the terminal that performs both the normal authentication and the security authentication.

The apparatus control unit may be further configured to allocate authority to access the normal area to a terminal that does not include the trusted platform therein and performs the normal authentication.

Still another aspect of the present invention provides a terminal for supporting a cloud service based on an enhanced security function. The terminal includes a communication unit configured to establish a communication channel for access a cloud service apparatus; and a control unit including a security region for providing encrypted information based on a trusted platform and a non-security region for supporting a user function based on the security function by communicating with the security region, and configured to control at least one of normal authentication and security authentication when accessing the cloud service apparatus, the normal authentication being based on preregistered ID and password information, the security authentication being based on the encrypted information, and to support a cloud service provided by the cloud service apparatus.

The terminal may further include an input unit configured to receive a predetermined security number required for entering into the security region from the non-security region in order to use the encrypted information, and the security region may be configured to create the encrypted information by encrypting a public key allocated to the trusted platform in response to a request for using the encrypted information after authentication of the secure number, and to transmit the encrypted information to the non-security region.

The terminal may further include a display unit configured to display a cloud service screen provided when at least one of the normal authentication and the security authentication is performed, and the display unit may be further configured to display at least one of a normal area access screen provided by the cloud service apparatus when the normal authentication is performed; a security area access screen provided by the cloud service apparatus when the security authentication is performed; and a unified area access screen, for both security area access and normal area access, provided by the cloud service apparatus when the security authentication is performed.

The control unit may be further configured to, in response to a specific input signal, transfer data displayed in the security area to the normal area, or to transfer data displayed in the normal area to the security area.

The normal area access screen may contain a security key map displayed at a part of the screen in order to request the security authentication after the normal authentication is completed.

Yet another aspect of the present invention provides a method for supporting a cloud service based on an enhanced security function. The method includes steps of, at a terminal, requesting access to a cloud service apparatus; performing normal authentication on the basis of basic authentication information including ID and password preregistered for the access to the cloud service apparatus by the terminal; after the normal authentication is performed, performing security authentication on the basis of encrypted information based on a trusted platform of the terminal; and depending on the result of performing the normal authentication and the security authentication, operating a cloud service provided by the cloud service apparatus.

The method may further include step of performing an input of a security number predetermined for performing the security authentication.

The step of operating may include at least one of steps of, at the cloud service apparatus, allocating normal area accessible authority based on a normal database to the terminal that performs the normal authentication; at the cloud service apparatus, allocating security area accessible authority based on a security database to the terminal that performs the security authentication; and at the cloud service apparatus, allocating both the normal area accessible authority based on the normal database and the security area accessible authority based on the security database to the terminal that performs both the normal authentication and the security authentication.

The method may further include at least one of steps of, at the terminal, displaying a normal area access screen provided by the cloud service apparatus when the normal authentication is performed; displaying a security key map for requesting the security authentication at a part of the normal area access screen; and at the terminal, displaying at least one of the normal area access screen and a security area access screen provided by the cloud service apparatus when the security authentication is performed.

Yet another aspect of the present invention provides a computer-readable medium having thereon a program executing steps of requesting access to a cloud service apparatus; performing normal authentication on the basis of basic authentication information including ID and password preregistered for the access to the cloud service apparatus by the terminal; after the normal authentication is performed, performing security authentication on the basis of encrypted information based on a trusted platform of the terminal; and depending on the result of performing the normal authentication and the security authentication, operating a cloud service provided by the cloud service apparatus.

Advantageous Effects

According to a cloud service system based on an enhanced security function and a method for supporting the system in this invention, this invention not only prevents information spill by improving the security of a cloud service that is accessible by a plurality of terminals, but also strengthens an information sharing function between users.

MODE FOR CARRYING OUT THE INVENTION

Hereinafter, embodiments of the present invention will be described in detail with reference to the accompanying drawings.

To avoid obscuring the subject matter of the present invention, well known techniques will be omitted from the following descriptions and drawings. Further, the same elements will be designated by the same reference numerals although they are shown in different drawings.

Although the drawings represent exemplary embodiments of the invention, the drawings are not necessarily to scale and certain features may be exaggerated or omitted in order to better illustrate and explain the present invention.

Figure 1:
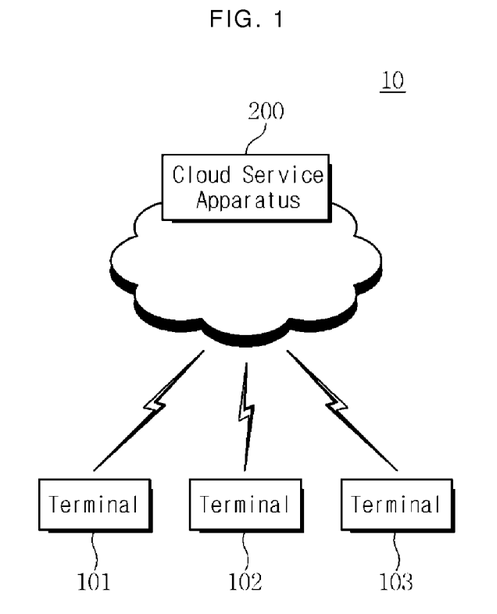
FIG. 1 is a schematic diagram illustrating the configuration of a cloud service system in accordance with an embodiment of the present invention.

FIG. 1 is a schematic diagram illustrating the configuration of a cloud service system in accordance with an embodiment of the present invention.

Referring to FIG. 1, the cloud service system 10 of this invention may include a cloud service apparatus 200 that supports a cloud service, and one or more terminals 101, 102 and 103 that access the cloud service apparatus 200 and use a cloud service.

The cloud service system 10 allows one or more terminals 101, 102 and 103 to access a cloud service, but permits access of terminals only authenticated through a check of predefined authentication information. Particularly, the cloud service system 10 permits terminals only having a trusted platform to access the cloud service apparatus 200 or differentially applies accessible information region of the cloud service apparatus 200 to terminals with a trusted platform and terminals without a trusted platform.

For this, when a request for access is received from a specific one of the terminals 101, 102 and 103, the cloud service apparatus 200 checks, for access permission, basic authentication information including predefined ID and password. Additionally, the cloud service apparatus 200 may further check encrypted information at least one terminal provides based on a trusted platform. If the encrypted information is identical to preregistered information, the cloud service apparatus 200 may permit the terminal, which provides the encrypted information, to use a cloud service. Also, the cloud service apparatus 200 may distinguish normal authentication based on basic authentication information from security authentication based on encrypted information, differentially establishing database access regions for a terminal performing normal authentication only and for a terminal performing security authentication.

Specifically, the cloud service apparatus 200 allows the first terminal 101, which performs both a normal authentication process based on basic authentication information and a security authentication process based on encrypted information, to access both a normal area and a security area. In contrast, the cloud service apparatus 200 allows the second and third terminals 102 and 103, which perform only a normal authentication process, to access a normal area only. Namely, the cloud service apparatus 200 differentially applies usable grades of a cloud service to the terminals 101, 102 and 103 according to their security types. Therefore, the terminal capable of performing a higher-reliable security function may store and share information in various forms on the basis of much stronger security.

As mentioned above, the terminals may be classified into a higher-reliable terminal, i.e., the first terminal 101 having a trusted platform, and a normal terminal, i.e., the second and third terminals 102 and 103 having no trusted platform. Excepting a trusted platform capable of supporting high-reliable user functions, the first terminal 101 may have physically and in software the same configuration as the second and third terminals 102 and 103. Meanwhile, the first terminal 101 may be designed to have a security region and a non-security region, which are independent from each other and communicate with each other through a specific interface. The first terminal 101 supports security user functions by using terminal identifier information stored in the security region. Particularly, for access to the cloud service apparatus 200, the first terminal 101 may encrypt terminal identifier information and support use of encrypted information. The first terminal 101 will be described in detail with reference to FIGS. 2 and 3.

Each of the second and third terminals 102 and 103 may be a normal terminal that does not have a trusted platform. The second and third terminals 102 and 103 may access the cloud service apparatus 200 through a wireless communication module and, in response to a request from the cloud service apparatus 200, perform a normal authentication process based on preregistered basic authentication information. For example, the second and third terminals 102 and 103 may transmit, to the cloud service apparatus 200, basic authentication information including preregistered ID information and password information.

Meanwhile, the second and third terminals 102 and 103 may receive a request for additional encrypted information according to a policy of the cloud service apparatus 200 and then automatically notify the cloud service apparatus 200 of impossibility of additional information transmission. Furthermore, the second and third terminals 102 and 103 may obtain access permission for a predefined normal area according to a design policy of the cloud service apparatus 200 and then access the normal area only. The second and third terminals 102 and 103 may perform a function to edit, delete or upload specific image information, audio information, and text information through the normal area, and also download and then store or play at least one of image information, audio information, and text information recorded in the normal area.

As discussed above, the cloud service system 10 in embodiments of this invention restricts use of a cloud service or permits use of the entire cloud service, depending on whether the terminals 101, 102 and 103 have a trusted platform or whether the terminals 101, 102 and 103 provide terminal identifier information and its encrypted information. Thus, the cloud service system 10 of this invention not only may support enhanced access to a cloud service according to reliability between the terminals 101, 102 and 103, but also may flexibly employ a function to store and share information through classification of accessible regions.

Figure 2:
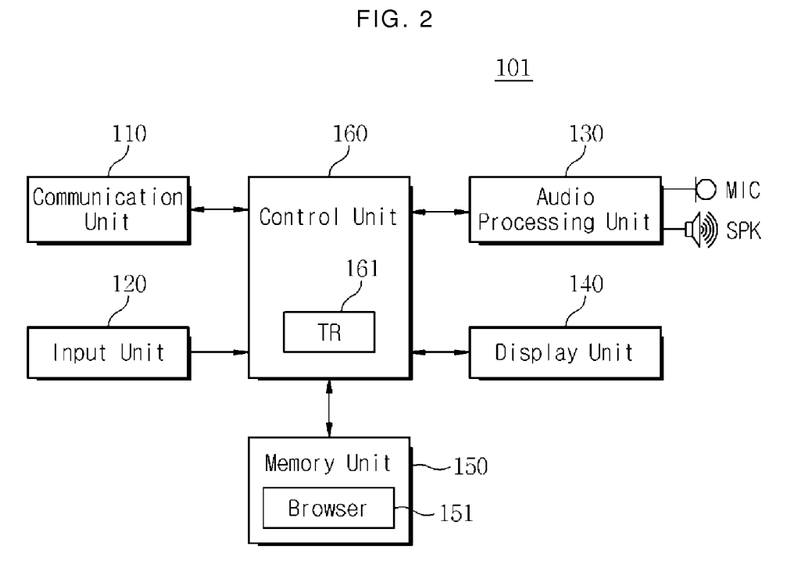
FIG. 2 is a block diagram illustrating the configuration of a terminal in accordance with an embodiment of the present invention.

FIG. 2 is a block diagram illustrating the configuration of the first terminal 101 having a trusted platform in accordance with an embodiment of the present invention.

Referring to FIG. 2, the first terminal 101 may include a communication unit 110, an input unit 120, an audio processing unit 130, a display unit 140, a memory unit 150, and a control unit 160. Additionally, the control unit 160 may have a trusted platform 161 provided in a physical form.

The first terminal 101 performs first a normal authentication process based on basic authentication information when accessing the cloud service apparatus 200 so as to use a cloud service, and then performs a security authentication process based on encrypted information the trusted platform 161 supports. Through this, the first terminal 101 may support higher-reliable security access. Also, by performing step of checking authentication information according to user's selection, the first terminal 101 may selectively use graded accessibility provided by the cloud service apparatus 200.

For this, the communication unit 110 may support establishment of a communication channel for access to the cloud service apparatus 200. In actual, any network system for supporting a cloud service may be provided between the cloud service apparatus 200 and the terminals 101, 102 and 103. This network system is used for forming a communication channel between the cloud service apparatus 200 and the terminals 101, 102 and 103. If the communication unit 110 of the first terminal 101 is formed of a mobile communication module, the network system may be configured to support the mobile communication module. Meanwhile, the communication unit 110 may be formed of many kinds of wired or wireless communication modules, and accordingly the network system may be formed of relevant communication network devices. For example, the communication unit 110 may be formed of at least one of various communication modules that support 2G, 3G or 4G communication systems such as CDMA, GSM, WCDMA, OFDMA, and the like.

The communication unit 110 may transmit encrypted information such as encrypted terminal identifier information to any specific device in response to user's request. Namely, the communication unit 110 may support channel establishment with a financial server that uses encrypted information or any other server that requires encrypted information as authentication information. Particularly, the communication unit 110 may support establishment of a channel for access to the cloud service apparatus 200 on the basis of encrypted information. In a process of establishing a channel, the communication unit 110 may transmit encrypted information to a relevant server under the control of the control unit 160. Additionally, the communication unit 110 may perform a process of registering encrypted information or terminal identifier information in the cloud service apparatus 200. In this process, the communication unit 110 may encrypt terminal identifier information by using a public key issued by the cloud service apparatus 200 and then offer encrypted information to the cloud service apparatus 200.

The input unit 120 may be formed of key buttons and the like. If the first terminal 101 employs a full touch screen, the input unit 120 may be formed of side keys, hot keys, or the like, and also may include a key map displayed on the touch screen. Additionally, the input unit 120 may include a number of input keys and function keys used for creating letter or numeral input signals and setting various functions. Particularly, the input unit 120 may create a variety of input signals for access to the cloud service apparatus 200, depending on user's manipulation.

For example, the input unit 120 may create, depending on user's input action, an input signal for entering address information of the cloud service apparatus 200 or requesting access to the cloud service apparatus 200, and an input signal for entering ID and password in response to a request from the cloud service apparatus 200. Also, the input unit 120 may create, in response to a request from the control unit 160, an input signal for using encrypted information based on a trusted platform, and an input signal for using a cloud service provided by the cloud service apparatus 200 after the cloud service apparatus 200 authenticates encrypted information. The above input signals may be delivered to the control unit 160 and used as instructions to perform relevant functions.

The audio processing unit 130 may include a speaker (SPK) for outputting various audio data generated during operation of the first terminal 101, and a microphone (MIC) for collecting audio data. Particularly, the audio processing unit 130 may support the output of various audio data associated with access to the cloud service apparatus 200. For example, the audio processing unit 130 may support the output of feedback sounds or sound effects associated with a process of checking basic authentication information by the cloud service apparatus 200, and the output of feedback sounds or sound effects for a process of checking encrypted information with the cloud service apparatus 200. Such output of feedback sounds or sound effects may be omitted according to user's setting, etc.

The display unit 140 displays information being inputted by a user or to be provided to a user, including various menus of the first terminal 101. Namely, the display unit 140 may provide various screens related to use of the first terminal 101, such as an idle screen, a menu screen, a message creation screen, a call screen, a terminal closing screen, a terminal booting screen, and the like. The display unit 140 may be formed of liquid crystal display (LCD), organic light emitted diode (OLED), or any other equivalent. The display unit 140 may be fabricated in the form of a combination a display panel and a touch panel.

Particularly, the display unit 140 may provide a screen interface for access to the cloud service apparatus 200. For example, the display unit 140 may provide a screen interface for supporting an input of ID and password required for performing a normal authentication process at the time of access to the cloud service apparatus 200, and a screen interface for showing access to a normal area and related functions provided by the cloud service apparatus 200 after a normal authentication process is completed. Also, the display unit 140 may provide a screen interface for performing a process of checking encrypted information based on a trusted platform, and a screen interface for showing access to a normal area, access to a security area and related functions provided by the cloud service apparatus 200 after a process of checking encrypted information is completed. And also, the display unit 140 may output a setting screen interface provided by the cloud service apparatus 200 so as to set basic authentication information required for the aforesaid normal authentication, and a setting screen interface for registering encrypted information.

The memory unit 150 stores applications or programs required for performing particular functions, screen images to be displayed on the display unit 140, and the like. If the display unit 140 is formed of a touch screen, the memory unit 150 may store a key map or a menu map for using the touch screen. In this case, a key map or a menu map may have various layouts. Specifically, a key map may be a 3*4 key map, a qwerty key map, or a control key map adapted for a currently running application. Similarly, a menu map may be adapted for a currently running application. The memory unit 150 may store an operating system (OS) for booting and operating the first terminal 101, and applications for supporting various user functions such as a call function of the first terminal 101, an MP3 user function for playing digital sounds, an image viewer function for outputting images such as photos, a video playback function, and the like.

Particularly, the memory unit 150 may store a browser 151 for access to the cloud service apparatus 200. The first terminal 101 may provide any icon or menu item for activating the browser 151, and in response to a selection of such item, the browser 151 is loaded in the control unit 160 and then supports a function to access the cloud service apparatus 200. Additionally, the browser 151 may support transmission or reception of data for a normal authentication process for access to a normal area provided by the cloud service apparatus 200. Similarly, the browser 151 may support transmission or reception of data for a security authentication process based on encrypted information for access to a security area provided by the cloud service apparatus 200.

When a request for access to a security area is received, or as a default, the browser 151 may support a process of inputting a security number for retrieving encrypted information supported by a trusted platform. If the security number input is identical to predefined specific information, the browser 151 sends a request for encrypted information to a trusted platform, receives the encrypted information from the trusted platform, and then transmits it to the cloud service apparatus 200. Thereafter, the browser 151 may support registration, modification or download of data through access to a normal area or a security area provided by the cloud service apparatus 200.

The control unit 160 controls a supply of power to respective elements of the first terminal 101 and performs an initialization process of such elements. Also, the control unit 160 may include a trusted platform 161 that transmits or receives various messages required for reading encrypted information and signals for access to the cloud service apparatus 200. For this, the control unit 160 may have the configuration as shown in FIG. 3.

Figure 3:
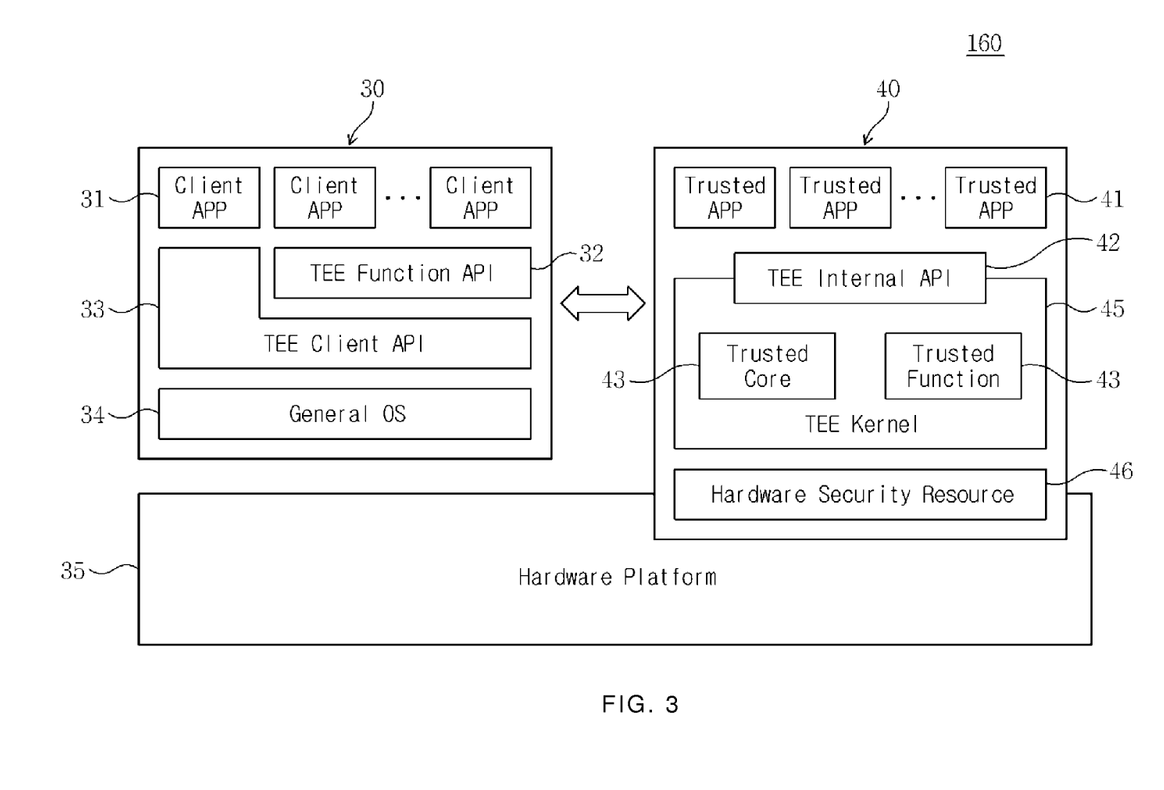
FIG. 3 is a block diagram illustrating the configuration of a control unit of the terminal in accordance with an embodiment of the present invention.

FIG. 3 is a block diagram illustrating the configuration of the control unit 160 of the present invention.

Referring to FIG. 3, the control unit 160 may include a non-security region 30, a security region 40, and a hardware platform 35.

The non-security region 30 may include an open operating system (OS) for user functions that do not require encrypted information. The non-security region 30 may control the execution of a particular user function according to an input signal received from the input unit 120 or from the display unit 140 having a touch screen function. For example, if an input signal for activating a camera function is received, the non-security region 30 may control related functions such as a camera activation, an image capture, an image save, and the like. The non-security region 30 may include an application layer 31, a TEE function API layer 32, a TEE client API layer 33, and a general OS layer 34.

The security region 40 is loaded in the control unit 160 in response to a call of the non-security region 30 and performs a function to provide encrypted information. For example, if the non-security region 30 requires encrypted information for a purchase of a music file in a music play function, the security region 40 may be called by the non-security region 30. In this process, the non-security region 30 may deliver retrieval information about the required encrypted information to the security region 40. The security region 40 may include a trusted application layer 41, a TEE internal API layer 42, a trusted core environment layer 43, a trusted function layer 44, and a hardware security resource layer 46. Here, the TEE internal API layer 42, the trusted core environment layer 43 and the trusted function layer 44 may be disposed on a TEE kernel layer 45, and the hardware security resource layer 46 may be disposed on the hardware platform 35.

In this control unit 160 based on the above-discussed trusted platform, if there is a request for encrypted information while the TEE client API layer 33 performs a specific user function through the application layer 31, the TEE function API layer 32 delivers a relevant call to the TEE client API layer 33. Then the TEE client API layer 33 requests any encrypted information required for a security function through a message communication with the TEE internal API layer 42. Then the TEE internal API layer 42 collects encrypted information stored in a hardware security resource through the trusted function layer 44, and sends the collected information to the TEE client API layer 33. As a result, the non-security region 30 calls terminal identifier information encrypted and stored in the hardware secure resource layer 46 that is accessible only through the trusted platform 161 located in the security region 40, and then delivers it to the cloud service apparatus 200. In this process, the trusted function layer 44 may perform a process of checking a security number predefined for securing the reliability of a call for encrypted information, and the non-security region 30 may support the display unit 140 to display a security number input screen for using encrypted information.

If a security number is inputted and if the trusted platform 161 properly checks related information, encrypted information is delivered to the non-security region 30. Alternatively, the security region 40 may be temporarily authorized to perform a check process for encrypted information by the non-security region 30, and then directly control data communication with the cloud service apparatus 200 through a direct control of the communication unit 110.

Figure 4:
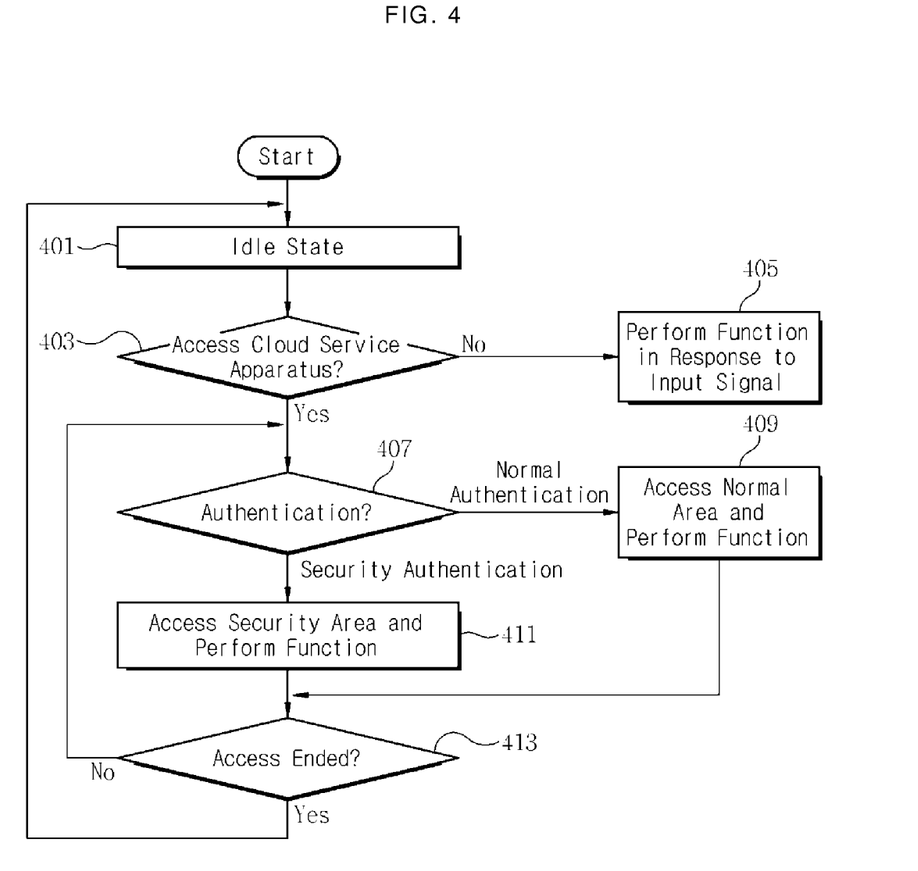
FIG. 4 is a flow diagram illustrating a method for operating the terminal for supporting a cloud service in accordance with an embodiment of the present invention.

FIG. 4 is a flow diagram illustrating a method for operating the first terminal 101 for supporting a cloud service in accordance with an embodiment of the present invention.

Referring to FIG. 4, after power is supplied, the control unit 160 of the first terminal 101 may initialize respective elements of the first terminal 101 or keep an initialized state. Then the first terminal 101 is in an idle state according to predetermined schedule information at step 401. In this idle state, the display unit 140 may display a predetermined idle screen also referred to as an initial screen or a home screen. Alternatively, an idle state may be replaced with any other state where a particular user function is performed depending on user's control. Thus, an idle state may correspond to a state of the terminal ready for using a cloud service.

Meanwhile, when an input signal is received from the input unit 120 or the display unit 140 having an input function, the first terminal 101 may check at step 403 whether the received input signal is an input signal for access to the cloud service apparatus 200. If the received input signal is not associated with access to the cloud service apparatus 200, the first terminal 101 may perform a particular function in response to the received input signal at step 405. For example, the first terminal 101 may perform a function to execute a selected file, a call function, a file edit function, a file search function, and the like, depending on the type of input signal.

If at step 403 the received input signal is for access to the cloud service apparatus 200, the first terminal 101 checks at step 407 the type of authentication to be performed with the cloud service apparatus 200. At this step, in order to create an input signal for access to the cloud service apparatus 200, the first terminal 101 may provide an icon, a widget or a menu item for executing a cloud service. This icon, widget or menu item may have a link to address information of the cloud service apparatus 200. If there are two or more cloud service apparatuses 200 which are accessible from the first terminal 101, the first terminal 101 may provide icons, widgets or menu items for access to the respective cloud service apparatuses 200. Alternatively, in this case, the first terminal 101 may provide a basic icon and then, if the basic icon is selected, provide a list of the cloud service apparatuses 200.

The type of authentication may include normal authentication and security authentication. Namely, an authentication check process performed at step 407 may include a normal authentication process of entering both ID and password which correspond to basic authentication information, and a secure authentication process of checking encrypted information provided by a trusted platform.

For normal authentication, the first terminal 101 receives, from the cloud service apparatus 200, necessary data for checking basic authentication information and outputs a screen interface for an input of basic authentication information. For example, the first terminal 101 may output a specific screen interface that allows a user to enter both ID and password which have been previously registered in the cloud service apparatus 200.

For security authentication, the first terminal 101 receives, from the cloud service apparatus 200, necessary data for checking encrypted information and outputs a screen interface for an input of encrypted information. At this step, the first terminal 101 may output a screen for an input of a security number required for use of encrypted information supported by a trusted platform, namely, a security number input screen for entering into the security region 40 from the non-security region 30 or a security number input screen for using encrypted information in the security region 40.

Meanwhile, if normal authentication only is performed at step 407, the first terminal 101 may perform at step 409 a cloud service based on normal authentication. Specifically, the first terminal 101 may obtain from the cloud service apparatus 200 the accessible authority for a normal area, then receive data regarding a normal area from the cloud service apparatus 200, and output the received data. A normal area may refer to a virtual data sharing space that is provided to terminals, which successively perform normal authentication, by the cloud service apparatus 200. The first terminal 101 may upload data to a normal area or selectively download data arranged in a normal area.

Such as normal area access service may be varied according to a policy of the cloud service apparatus 200. If the cloud service apparatus 200 is designed to disallow any cloud service for a terminal which performs normal authentication only, the first terminal 101 may receive from the cloud service apparatus 200 a message of no cloud service allowed or a message of security authentication required.

If security authentication is performed at step 407, the first terminal 101 may use at step 411 a particular cloud service provided by the cloud service apparatus 200. Specifically, the first terminal 101 may obtain from the cloud service apparatus 200 the accessible authority for at least one of a normal area and a security area, and then use a data sharing service through a selected region. For example, the first terminal 101 which performs security authentication may upload or download data to or from a security area, or transfer data from a security area to a normal area, and vice versa. A security authentication process may be performed through a process of entering a security number so as to transmit encrypted information provided by a trusted platform to the cloud service apparatus 200. Namely, at the first terminal 101, a security authentication process may be a process of inputting a security number so as to access the security region 40 from the non-security region 30.

In a security authentication process, if encrypted information is received from the first terminal 101, the cloud service apparatus 200 may check whether the received information is identical to predefined information. For this, the cloud service apparatus 200 may store in advance any information to be compared with encrypted information of the first terminal 101.

Although an authentication process of step 407 is described above as being performed independently, this is exemplary only and not to be considered as a limitation of the present invention. Alternatively, a security authentication process may be additionally performed after a normal authentication process is performed. In this case, the first terminal 101 may perform a security authentication process at step 411 after step 409.

After accessing a normal area and performing related functions, or after accessing a security area and performing related functions, the first terminal 101 checks at step 413 whether an input signal for ending the access to the cloud service apparatus 200 or for ending the use of a cloud service is received. If the use of a cloud service is maintained, the first terminal 101 may return to step 403 and use a cloud service according to the type of authentication. If the above ending signal is received, the first terminal 101 may return to step 401 and perform again the above-discussed procedure.

As discussed hereinbefore, the terminal and method for a cloud service based on an enhanced security function may support the use of encrypted information of the trusted platform 161 with higher-reliability in an authentication process. Moreover, even in case of a terminal having no trusted platform 161, it is possible to support the use of a cloud service with proper grade according to a service policy.

Figure 5:
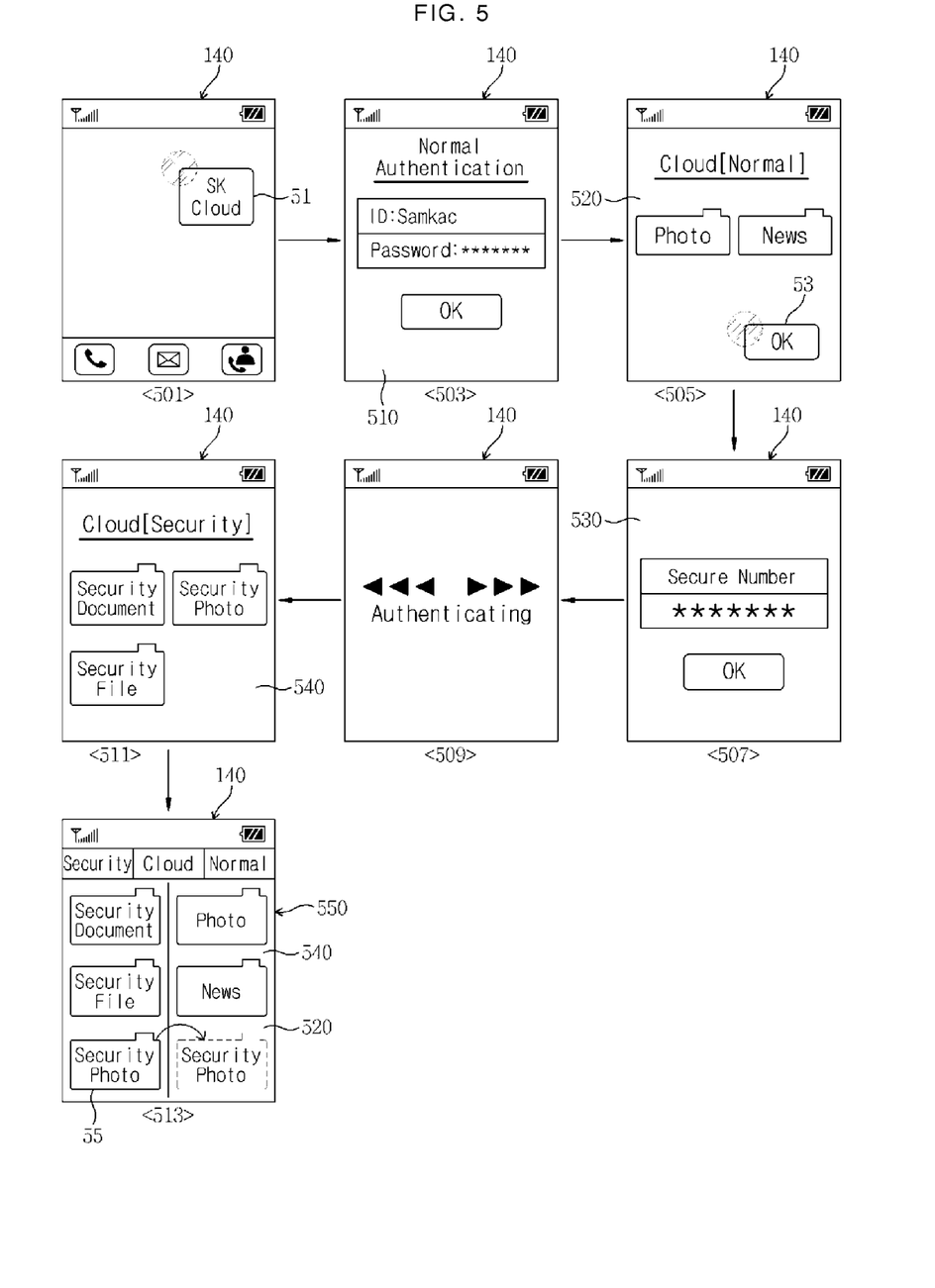
FIG. 5 is a diagram exemplarily illustrating screen interfaces of the terminal provided in a cloud service of the present invention.

FIG. 5 is a diagram exemplarily illustrating screen interfaces of the first terminal 101 provided in a cloud service in accordance with an embodiment of the present invention.

Referring to FIG. 5, as shown in screenshot 501, the first terminal 101 may provide on the display unit 140 a screen that outputs an icon 51 for access to the cloud service apparatus 200 according to predetermined schedule information or in response to user's input. Alternatively, instead of this icon 51, a widget or a menu item may be provided.

When a user selects the icon 51 to perform access to the cloud service apparatus 200, the first terminal 101 may output, as shown in screenshot 503, a screen that receives an input of ID and password for access to the cloud service apparatus 200 on the display unit 140. At this time, in response to an input signal for selecting the icon 51, the first terminal 101 may acquire address information of the cloud service apparatus 200 linked to the icon 51, activate the communication unit 110, and then transmits an access request message to the cloud service apparatus 200. For this, the first terminal 101 may link address information of the accessible cloud service apparatus 200 to the icon 51.

Meanwhile, the first terminal 101 may receive from the cloud service apparatus 200 a message for requesting basic authentication information associated with normal authentication, and then based on the received message, may construct a basic information input screen 510 that receives an input of ID and password as shown in screenshot 503. The first terminal 101 may register in advance such ID and password in the cloud service apparatus 200. If there is no pre-registered ID and password in the cloud service apparatus 200, the first terminal 101 may create and store ID and password through a separate registration process provided by the cloud service apparatus 200. These ID and password may be stored in the cloud service apparatus 200 and then will be used as authentication information when the first terminal 101 requests access.

When ID and password are inputted as shown in screenshot 503, the first terminal 101 provides the inputted ID and password to the cloud service apparatus 200. Then, if these ID and password are valid information, the cloud service apparatus 200 may provide the first terminal 101 with normal area accessible authority that allows a cloud service based on normal authentication. Of course, the cloud service apparatus 200 may offer normal area accessible authority for only the first terminal 101 that performs normal authentication on the basis of basic authentication information including ID and password.

Then, as shown in screenshot 505, the first terminal 101 may output on the display unit 140 a normal area access screen 520 that allows reception of information about data contained in a normal area, upload or download of data. Particularly, the first terminal 101 which has the trusted platform 161 may output, on a part of the normal area access screen 520, a security button map 53 that allows acquisition of security area accessible authority provided by the cloud service apparatus 200.

If a user selects the security button map 53 as shown in screenshot 505, the first terminal 101 may output a security number input screen 530 for the use of encrypted information on the display unit 140 as shown in screenshot 507. The security number input screen 530 is provided for an authentication process in which the non-security region 30 sends a request for encrypted information to the security region 40. A user may determine in advance a security number, and the first terminal 101 may output the security number input screen 530 to confirm a predetermined secure number in response to a request for encrypted information.

After a valid security number is inputted as shown in screenshot 507, the first terminal 101 checks terminal identifier information stored in the security region 40 and encrypts it to create encrypted information. Then the first terminal 101 may transmit the encrypted information to the cloud service apparatus 200. At this time, the first terminal 101 may encrypt terminal identifier information by means of a public key and then send it to the cloud service apparatus 200. Alternatively, the first terminal 101 may encrypt terminal identifier information by using a symmetric key agreed in advance with the cloud service apparatus 200 and then deliver it to the could service apparatus 200. In this process, the first terminal 101 may output, as shown in screenshot 509, a screen that indicates the progress of authentication based on encrypted information.

After authentication is completed, the first terminal 101 receives data corresponding to a security area access screen 540 from the cloud service apparatus 200 and then, based on the received data, outputs the security area access screen 540 on the display unit 140 as shown in screenshot 511. Meanwhile, if a page change request is received from a user, the first terminal 101 may output, as a single screen, a unified area access screen 550 that includes both the security area access screen 540 and the normal area access screen 520 as shown in screenshot 513. Alternatively, instead of the security area access screen 540 shown in screenshot 511, the first terminal 101 may output, as a default, the unified area access screen 550 shown in screenshot 513 on the display unit 140.

As shown in screenshot 513, a user can transfer, e.g., through a drag, specific data, e.g., a security photo 55, from the security area access screen 540 to the normal area access screen 520. Then the first terminal 101 may create a message regarding a transfer of the security photo 55 and transmit it to the cloud service apparatus 200. When receiving this message regarding a data transfer, the cloud service apparatus 200 may adjust the locations of data respectively stored in the normal area and the security area. Similarly, the first terminal 101 may transfer data from the normal area to the secure area in response to user's request, transmit a related message to the cloud service apparatus 200, and support a screen modification resulting from a data transfer.

Although it is described above that the cloud service apparatus 200 allows a separate access to the normal area or the security area, this is exemplary only and not to be considered as a limitation of the present invention. Alternatively, the cloud service apparatus 200 may not provide a cloud service for a terminal that performs normal authentication only by means of basic authentication information, while requiring security authentication, according to a service policy. In this case, the first terminal 101 may not provide the aforesaid screenshot 505.

Figure 6:
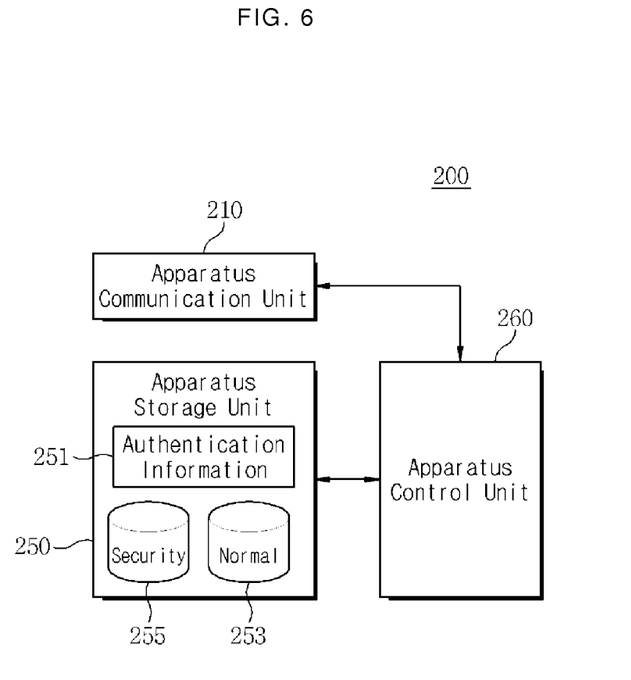
FIG. 6 is a block diagram illustrating the configuration of a cloud service apparatus of the present invention.

FIG. 6 is a block diagram illustrating the configuration of the cloud service apparatus 200 in accordance with an embodiment of the present invention.

Referring to FIG. 6, the cloud service apparatus 200 may include an apparatus communication unit 210, an apparatus storage unit 250, and an apparatus control unit 260.

The apparatus communication unit 210 is configured to establish a communication channel with the terminals 101, 102 and 103 that request access to the cloud service apparatus 200, and then to support transmission or reception of various signals required for a cloud service through the channel. For example, the apparatus communication unit 210 may transmit, to the access-requesting terminal 101, 102 or 103, a message for requesting basic authentication information required for normal authentication under the control of the apparatus control unit 260. Also, the apparatus communication unit 210 may receive basic authentication information from the access-requesting terminal 101, 102 or 103 and deliver it to the apparatus control unit 260. And also, the apparatus communication unit 210 may receive encrypted information from a terminal having the trusted platform 161, e.g., the first terminal 101, and deliver it to the apparatus control unit 260.

The apparatus storage unit 250 may store authentication information 251 used to identify the terminal 101, 102 or 103 that requests access for a cloud service. Additionally, the apparatus storage unit 250 may include a normal database 253 for supporting a normal area and a security database 255 for supporting a security area, depending on a service policy of the cloud service apparatus 200. The authentication information 251 may include basic authentication information of the respective terminals 101, 102 and 103, and further include encrypted information of the terminal having the trusted platform 161. Encrypted information may contain public key information used as terminal identifier information. Also, the apparatus storage unit 250 may store various encryption algorithms, e.g., a public key algorithm or a symmetric key algorithm, to be used for decryption of encrypted information.

The normal database 253 is a storage section that is accessible on the basis of basic authentication information from any terminal with or without the trusted platform 161. The normal database 253 allows access from only the terminals 101, 102 and 103 that perform normal authentication, and may support upload or download of data through such access.

The security database 255 is a storage section that is accessible from only the terminal having the trusted platform 161. For this, the security database 255 may be constructed separately from the normal database 253, and may support data upload from or data download to the terminals that perform security authentication or perform both normal authentication and security authentication.

Meanwhile, the cloud service apparatus 200 may use only the security database 255 without using the normal database 253. In this case, only a terminal having the trusted platform 161 among the terminals 101, 102 and 103 may use, based on the security database 255, a cloud service provided by the cloud service apparatus 200.

The apparatus control unit 260 controls a flow of various signals required for operation of the cloud service apparatus 200 and, especially, may control a cloud service based on authentication. Specifically, according to a service policy of the cloud service apparatus 200, the apparatus control unit 260 may perform normal authentication by receiving basic authentication information from the access-requesting terminal and further perform security authentication by receiving encrypted information from that terminal. Also, the apparatus control unit 260 may authorize a terminal passing both normal authentication and security authentication to access database for a cloud service.

Meanwhile, according to a cloud service policy, the apparatus control unit 260 may authorize the terminals 101, 102 and 103 passing normal authentication to access the normal database 253. Also, the apparatus control unit 260 may authorize the terminal passing security authentication to access the security database 255. Particularly, the apparatus control unit 260 may authorize the terminal passing security authentication to access both the normal database 253 and the security database 255, and further offer authority for data exchange between the normal database 253 and the security database 255.

Figure 7:
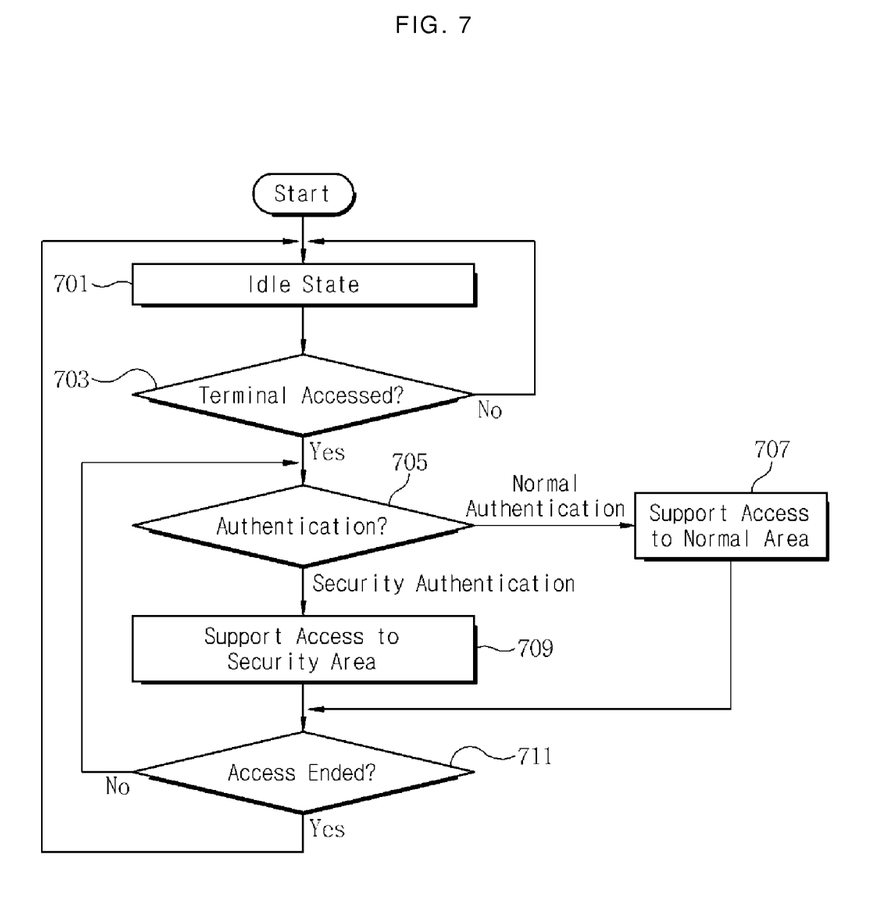
FIG. 7 is a flow diagram illustrating a method for operating the cloud service apparatus of the present invention.

FIG. 7 is a flow diagram illustrating a method for operating the cloud service apparatus 200 in accordance with an embodiment of the present invention.

Referring to FIG. 7, at step 701, the cloud service apparatus 200 may keep in an idle state ready for using a cloud service by the terminals 101, 102 and 103. For this, the cloud service apparatus 200 may activate an operating system and enter into an idle state that allows access from the terminals 101, 102 and 103 through the network system.

Next, at step 703, the cloud service apparatus 200 checks whether there is access from a terminal. If there is no reception of message corresponding to terminal access, the cloud service apparatus 200 may return to step 701. In actual, the cloud service apparatus 200 may keep in an idle state and, when an access request message is received from a terminal, perform the subsequent process.

Meanwhile, if there is an access request from a terminal at step 703, the cloud service apparatus 200 may check at step 705 the type of authentication of the access-requesting terminal. At this step, if the access-requesting terminal performs normal authentication only, i.e., performs authentication based on basic authentication information having preregistered ID and password, the cloud service apparatus 200 may support a cloud service based on normal authentication at step 707. Namely, the cloud service apparatus 200 may provide normal area accessible authority such that the terminal passing normal authentication can access a normal area based on the normal database 253.

If the access-requesting terminal performs security authentication or performs both normal authentication and security authentication at step 705, the cloud service apparatus 200 may provide the terminal with accessible authority for a security area based on the security database 255. Alternatively, the cloud service apparatus 200 may provide accessible authority for both a normal area and a security area.

Next, step 711, the cloud service apparatus 200 may check whether access from the terminal is ended. If there is no reception of message for ending the access, the cloud service apparatus 200 may return to step 705 and perform again subsequent steps. At this time, the terminal having the trusted platform 161 may obtain normal area accessible authority only and then, by further performing security authentication in a cloud service based on a normal area, may obtain security area accessible authority.

Meanwhile, if the access is ended at step 711, the cloud service apparatus 200 may return to step 701 and perform again subsequent steps.

Figure 8:
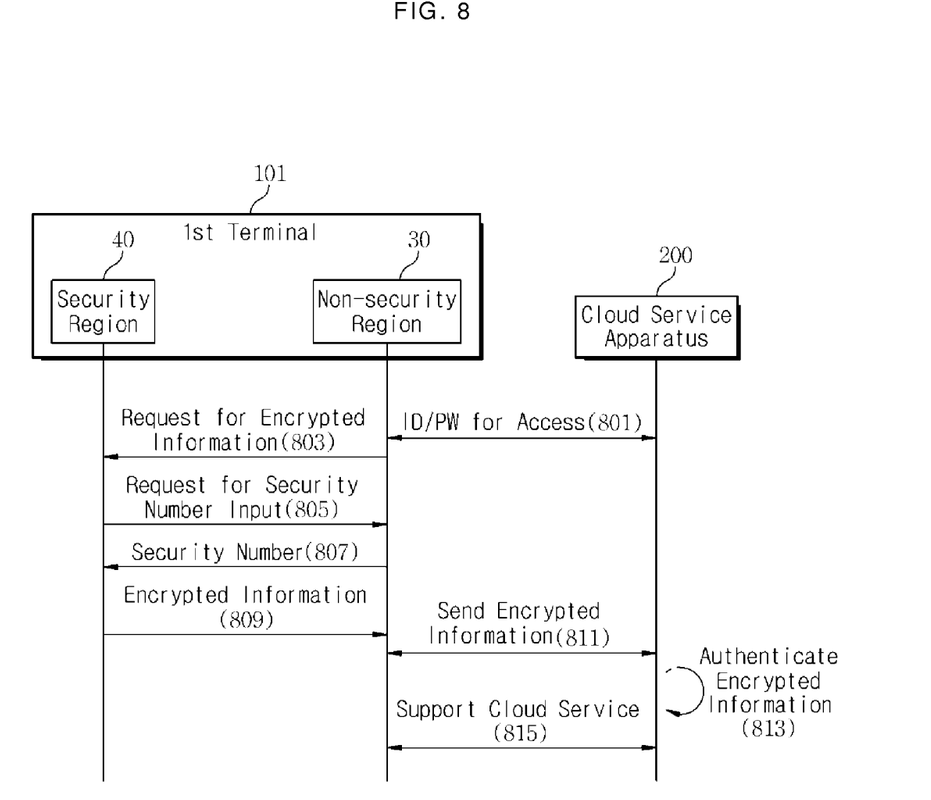
FIG. 8 is a flow diagram illustrating a method for operating a cloud service system in accordance with an embodiment of the present invention.

FIG. 8 is a flow diagram illustrating a method for operating the cloud service system based on a signal flow between the first terminal 101 having the trusted platform 161 and the cloud service apparatus 200 in accordance with an embodiment of the present invention.

Referring to FIG. 8, at the outset, the first terminal 101 receives an input signal for use of a cloud service from the input unit 120 or the display unit 140 having an input function. Then, at step 801, the non-security region 30 of the first terminal 101 may perform a process of accessing the cloud service apparatus 200. For example, the non-security region 30 may acquire address information of the cloud service apparatus 200 and transmit an access request message to the cloud service apparatus 200. Additionally, the non-security region 30 may receive a request for basic authentication information including ID and password from the cloud service apparatus 200. Then the non-security region 30 may output on the display unit 140 a screen for receiving ID and password as shown in a screen interface discussed above. A user can enter ID and password through the input unit 120 or the like. Then the non-security region 30 may create a message including the received ID and password and transmit it to the cloud service apparatus 200.

Thereafter, when a response to basic authentication information is received from the cloud service apparatus 200, the non-security region 30 may transmit a request for encrypted information to the security region 40 at step 803. When the encrypted information request is received from the non-security region 30, the security region 40 may transmit a request for an input of security number to the non-security region 30 at step 805. The non-security region 30 may construct a screen interface for receiving a security number, and a user can enter a security number through the screen interface.

After an input of a security number is completed, the non-security region 30 transmits the inputted security number to the security region 40 at step 807. The security region 40 checks whether the inputted security number is identical to a pre-stored security number. Then, at step 809, the security region 40 may encrypt a public key corresponding to terminal identifier information and transmit encrypted information to the non-security region 30.

The non-security region 30 that receives encrypted information from the security region 40 may transmit the encrypted information to the cloud service apparatus 200 at step 811. Then the cloud service apparatus 200 checks at step 81 whether the encrypted information is identical to pre-stored information. If identical, the cloud service apparatus 200 may support a cloud service to the access-requesting terminal at step 815. Therefore, the first terminal 101 may perform a download of data, a search for data, edition or deletion of upload data, and the like through the cloud service apparatus 200.

As fully discussed above, the cloud service supporting method according to embodiments of this invention not only performs normal authentication on the basis of basic authentication information having ID and password which are pre-registered in the cloud service apparatus 200 by a terminal, but also performs security authentication on the basis of encrypted information based on a trusted platform. Thus, the cloud service supporting method of this invention may enhance a security function for a data upload and download process used through a cloud service. Additionally, this invention may support a differential use of data to be shared through a cloud service by separating accessible areas according to normal authentication and security authentication. Namely, the cloud service system and related supporting method of this invention not only enhance a degree of security, but also support a proper use of a data sharing function, by differentially establishing database areas accessible according to authentication grades.

Meanwhile, the above-discussed first terminal 101 may essentially or selectively include any other module or element. For example, the first terminal 101 may further include a short range communication module, a wired or wireless data transmission interface, an Internet access module, a digital broadcast receiving module, and the like. According to a digital convergence tendency today, such elements may be varied, modified and improved in various ways, and any other elements equivalent to the above elements may be additionally or alternatively equipped in the first terminal 101. Additionally, as will be understood by those skilled in the art, some of the above-mentioned elements in the first terminal 101 may be omitted or replaced with another.

Furthermore, the first terminal 101 according to embodiments of this invention may include any types of electronic devices that have a trusted platform in a control unit. For instance, the first terminal 101 may include portable devices, multimedia players and their application equipment, especially including mobile communication terminals based on various communication protocols, a portable multimedia player (PMP), a digital broadcasting player, a personal digital assistant (PDA), a music player (e.g., an MP3 player), a portable game console, a smart phone, a notebook, a handheld PC, and the like.

While this invention has been particularly shown and described with reference to an exemplary embodiment thereof, it will be understood by those skilled in the art that various changes in form and details may be made therein without departing from the subject matter of the invention. Specific terms used in this disclosure and drawings are used for illustrative purposes and not to be considered as a limitation of the present invention.

INDUSTRIAL APPLICABILITY

As discussed above, the present invention can provide an enhanced security function when applied to the field of a cloud service that interworks with portable terminals. Particularly, this invention not only prevents information spill by improving the security of a cloud service that is accessible by a plurality of terminals, but also strengthens an information sharing function between users. Thus, this invention has industrial applicability.

What is claimed is:

1. A cloud service system based on an enhanced security function, the system comprising:
    a terminal including a trusted platform therein, and configured to
        perform security authentication based on encrypted information provided by the trusted platform,
        perform normal authentication based on preregistered identification (ID) and password information, and
        use a cloud service according to the security authentication and the normal authentication; and
    a cloud service apparatus configured to
        provide the cloud service to the terminal after completing the security authentication and the normal authentication with the terminal that includes the trusted platform therein,
        allocate normal area accessible authority based on a normal database to the terminal that performs the normal authentication, and
        allocate security area accessible authority based on a security database to the terminal that performs the security authentication.

2. A cloud service apparatus based on an enhanced security function, the apparatus comprising:
    an apparatus communication unit configured to establish a communication channel for access from a terminal including a trusted platform therein;
    an apparatus control device configured to
        perform at least one of security authentication and normal authentication, the security authentication being based on encrypted information provided by the trusted platform, the normal authentication being based on preregistered identification (ID) and password information, and
        support a cloud service according to the security authentication and the normal authentication; and
    an apparatus storage unit configured to store a database for supporting the cloud service,
    wherein the apparatus storage unit is further configured to store:
        a security database configured to realize a security area that is accessible according to the security authentication;
        a normal database configured to realize a normal area that is accessible according to the normal authentication; and
        authentication information for authenticating the terminal that requests the access.

3. The cloud service apparatus of claim 2, wherein the apparatus control unit is further configured to:
    allocate authority to access the normal area to the terminal that performs the normal authentication;
    allocate authority to access the security area or authority to access both the security area and the normal area to the terminal that performs the security authentication; or
    allocate authority to access the security area or authority to access both the security area and the normal area to the terminal that performs both the normal authentication and the security authentication.

4. The cloud service apparatus of claim 2, wherein the apparatus control unit is further configured to allocate authority to access the normal area to a terminal that does not include the trusted platform therein and performs the normal authentication.

5. A terminal for supporting a cloud service based on an enhanced security function, the terminal comprising:
    a communication unit configured to establish a communication channel for access a cloud service apparatus; and
    a control device
        including a security region for providing encrypted information based on a trusted platform, and a non-security region for supporting a user function based on the security function by communicating with the security region, and
        configured to control at least one of normal authentication and security authentication when accessing the cloud service apparatus, the normal authentication being based on preregistered identification (ID) and password information, the security authentication being based on the encrypted information, and to support a cloud service provided by the cloud service apparatus;
    an input unit configured to receive a predetermined security number required for entering into the security region from the non-security region to use the encrypted information,
    wherein the security region is configured to
        create the encrypted information by encrypting a public key allocated to the trusted platform in response to a request for using the encrypted information after authentication of the security number, and
        transmit the encrypted information to the non-security region.

6. The terminal of claim 5, further comprising:
    a display unit configured to display a cloud service screen provided when at least one of the normal authentication and the security authentication is performed,
    wherein the display unit is further configured to display at least one of:
    a normal area access screen provided by the cloud service apparatus when the normal authentication is performed;
    a security area access screen provided by the cloud service apparatus when the security authentication is performed; and
    a unified area access screen, for both security area access and normal area access, provided by the cloud service apparatus when the security authentication is performed.

7. The terminal of claim 6, wherein the control unit is further configured to, in response to a specific input signal, transfer data displayed in the security area access screen to the normal area access screen, or transfer data displayed in the normal area access screen to the security area access screen.

8. The terminal of claim 6, wherein the normal area access screen contains a security key map displayed at a part of the screen to request the security authentication after the normal authentication is completed.

9. A method for supporting a cloud service based on an enhanced security function, the method comprising:
    at a terminal,
        requesting access to a cloud service apparatus;
        performing normal authentication by a computer processor on the basis of basic authentication information including identification (ID) and password, which are preregistered for the access to the cloud service apparatus by the terminal;

after the normal authentication is performed, performing security authentication on the basis of encrypted information based on a trusted platform of the terminal; and at the cloud service apparatus, allocating normal area accessible authority based on a normal database to the terminal that performs the normal authentication;

allocating security area accessible authority based on a security database to the terminal that performs the security authentication; and depending on the result of performing the normal authentication and the security authentication, operating a cloud service provided by the cloud service apparatus.

10. The method of claim 9, further comprising:
performing, at the terminal, an input of a security number predetermined for performing the security authentication.

11. The method of claim 9, further comprising:
at the cloud service apparatus,
allocating both the normal area accessible authority based on the normal database and the security area accessible authority based on the security database to the terminal that performs both the normal authentication and the security authentication.

12. The method of claim 11, further comprising at least one of:
at the terminal,
displaying a normal area access screen provided by the cloud service apparatus when the normal authentication is performed;

displaying a security key map for requesting the security authentication at a part of the normal area access screen; and displaying at least one of the normal area access screen and a security area access screen provided by the cloud service apparatus when the security authentication is performed.

13. A non-transitory computer-readable medium having thereon a program executing:

requesting access from a terminal to a cloud service apparatus;

performing normal authentication on the basis of basic authentication information including identification (ID) and password, which are preregistered for the access to the cloud service apparatus by the terminal;

after the normal authentication is performed, performing security authentication on the basis of encrypted information based on a trusted platform of the terminal;

allocating normal area accessible authority based on a normal database to the terminal that performs the normal authentication;

allocating security area accessible authority based on a security database to the terminal that performs the security authentication; and depending on the result of performing the normal authentication and the security authentication, operating a cloud service provided by the cloud service apparatus.

* * * * *